United States Patent [19]
Weichmann et al.

[11] Patent Number: 5,789,526
[45] Date of Patent: Aug. 4, 1998

[54] HIGHLY VISCOUS CONDENSATION PRODUCTS CONTAINING SULFONIC ACID GROUPS BASED ON AMINO-S-TRIAZINES

[75] Inventors: Josef Weichmann, Pleiskirchen; Franz Wolfertstetter, Wonneberg; Herbert Winkelmann, Garching; Alfred Kern, Kirchweidach, all of Germany

[73] Assignee: SKW Trostberg Aktiengesellschaft, Trostberg, Germany

[21] Appl. No.: 604,852

[22] Filed: Feb. 22, 1996

[30] Foreign Application Priority Data

Feb. 23, 1995 [DE] Germany .............. 195 06 218.3

[51] Int. Cl.$^6$ .............. C08G 12/40; C08G 12/30; C04B 24/22
[52] U.S. Cl. .............. 528/254; 528/251; 528/255; 528/258; 528/265; 524/593; 524/597
[58] Field of Search .............. 528/254, 251, 528/255, 258, 265; 524/593, 597

[56] References Cited

U.S. PATENT DOCUMENTS 4,501,939  2/1985  Bürge et al. .............. 524/247
5,071,945  12/1991  Weichmann et al. .............. 528/254

FOREIGN PATENT DOCUMENTS 0336165  10/1989  European Pat. Off. .
2359291  10/1974  Germany .

*Primary Examiner*—Duc Truong
*Attorney, Agent, or Firm*—Felfe & Lynch

[57] ABSTRACT

Disclosed is a highly viscous condensation product containing sulfonic acid groups based on amino-s-triazines with at least 2 amino groups and formaldehyde which has a viscosity of 500 to 100.000 cp at 20° C. and a pH value of 8.0 to 13.0 as an aqueous solution with a solids content of 20% by weight. The product is obtainable by (a) condensation of amino-s-triazine, formaldehyde and sulfite in a molar ratio of 1:1.9 to 2.9:0.7 to 1.3 in aqueous solution at a pH value of 9.0 to 12.0 and a temperature of 50° to 90° C. until the sulfite is no longer detectable, and (b) subsequent further condensation at a pH value of 2.0 to 5.0 and a temperature of 50° to 100° C. until the viscosity exhibits the desired value.

22 Claims, 2 Drawing Sheets

HIGHLY VISCOUS CONDENSATION PRODUCTS CONTAINING SULFONIC ACID GROUPS BASED ON AMINO-S-TRIAZINES

BACKGROUND OF THE INVENTION

The invention concerns highly viscous condensation products containing sulfonic acid groups based on amino-s-triazines with at least two amino groups and formaldehyde, the production thereof and their use as stabilizers for aqueous suspensions, in particular aqueous binder suspensions.

Condensation products containing sulfonic acid groups based on amino-s-triazine with at least two amino groups and formaldehyde which have a low content of free formaldehyde are described in EP 336 165 B1. Due to their good dispersing properties, these polycondensates are used as additives for hydraulically hardening building material mixtures such as e.g. mortar, concrete, plaster, anhydrite etc. and are known to a person skilled in the art as so-called "superplasticizers" or "flow-improving agents". Their action is due to the deflocculation of the suspensions of solids present as building material mixtures. As a result of the deflocculation the solid particles are individually dispersed and more mobile which leads to a lowering of the yield point i.e. to a reduction in viscosity. Although the dispersing effect of these flow-improving agents thus reduces the amount of energy required to produce a suspension, the stability of the suspension is, however, counteracted by the lower viscosity of the total system.

Important factors for the construction of a mechanically stable structure and thus for the future quality of the building are a homogeneous and flawless dispersion of the binder and the various aggregates before and during the hardening.

Since binder and aggregate usually always differ in particle size distribution and in density, sedimentation phenomena and segregation of the mixing water can occur particularly when using flow-improving agents. These processes are known to building workmen as settling or demixing and bleeding.

There have therefore been no lack of attempts to improve the cohesiveness of inorganic building material suspensions. For this purpose so-called thickeners are added which, in contrast to flow-improving agents, increase the viscosity of the entire system.

Examples of conventional thickeners are starch and cellulose derivatives such as e.g. methyl ethers (methyl starch, methyl cellulose) and the corresponding mixed ethers which may be additionally hydroxypropylated or hydroxyethylated to various extents (methylhydroxypropylcellulose, methylhydroxyethylcellulose). Such modified polysaccharides are readily water-soluble due to their many hydroxyl side groups. They achieve their thickening action by increasing the viscosity which is a result of their high molecular weight and by forming hydrogen bonds with the OH substituents.

The production and use of such polysaccharide thickeners is described in Houben-Weyl, "Methoden der organischen Chemie", Vol. E 20/3, "Makromolekulare Stoffe", pages 2042 ff (1987, Georg Thieme Verlag, Stuttgart - N.Y.).

The thickening action of water-soluble polyalkylene glycols which are produced from ethylene oxide or propylene oxide by homopolymerization of blockpolymerization is also due to an increase in viscosity (cf. Houben-Weyl, Vol. E 20/2, pages 1367 ff). In this case the increase in the viscosity of the water is also transferred to the total system and counteracts the gravitational sedimentation of the solid particles.

However, a disadvantage in using thickeners to stabilize suspensions is that their activity is accompanied by pronounced changes in the rheology and consistency of the building material mixtures and in particular by an increase in the yield point and viscosity. In addition, depending on the dosage, an undesired influence on the setting properties of inorganic binders occurs which manifests itself in the form of retardations in setting and hardening.

Another major disadvantage is the amount of air usually introduced by the thickener during the mixing process. The introduced air voids lower the density of the building material mixtures and therefore lead to reduced compressive strength and tensile strength of the hardened building material.

The object of the invention is therefore to provide new additives for aqueous suspensions which do not have the said disadvantages of the state of the art but instead have good suspension-stabilizing properties without adversely affecting the other technical application properties of the aqueous suspensions and in particular of inorganic binder suspensions.

The above stated object is achieved according to the invention by highly viscous condensation products containing sulfonic acid groups based on amino-s-triazines with at least 2 amino groups and formaldehyde, which is characterized in that they have a viscosity of 500 to 100 000 cp at 20° C. and a pH value of 8.0 to 13.0 as aqueous solutions with a solids content of 20% by weight. The highly viscous condensation products are obtainable by a) condensation of amino-s-triazine, formaldehyde and sulfite in a molar ratio of 1:1.9 to 2.9:0.7 to 1.3 in aqueous solution at a pH value of 9.0 to 12.0 and a temperature of 50° to 90° C. until the sulfite is no longer detectable and b) subsequent further condensation at a pH value of 2.0 to 5.0 and a temperature of 50° to 100° C. until the viscosity exhibits the desired value.

Surprisingly the condensation products according to the invention have very good suspension-stabilizing properties, and their action of preventing sedimentation is not accompanied by a significant increase in viscosity of the aqueous suspensions.

A further surprising effect is that the condensation products according to the invention do not undergo jellification which is typical for aminoplast resins containing methylol groups but instead represent incoherent reversible colloids as demonstrated by the very pronounced Tyndall effect of their aqueous solutions.

The invention furthermore is in a process for producing the above defined condensation products. The production process is characterized in that a) amino-s-triazine, formaldehyde and sulfite are condensed in a molar ratio of 1:1.9 to 2.9:0.7 to 1.3 in aqueous solution at a pH value of 9.0 to 12.0 and a temperature of 50° to 90° C. until sulfite is no longer detectable and b) subsequently condensation is continued at a pH value of 2.0 to 5.0 and a temperature of 50° to 100° C. until the viscosity of an aqueous solution alkalinized at a pH value of 8.0 to 13.0 and having a solids content of 20% by weight has a value of 500 to 100,000 cp at 20° C.

Melamine is preferably used as the amino-s-triazine with at least 2 $NH_2$ groups. It is also possible to use difunctional amino-s-triazines such as benzoguanamine or acetoguanamine, the corresponding guanaminesulfonic acid or ammeline. In general, up to 50 mole % of the amino-s-triazine can be replaced by other aminoplast formers within the scope of the present invention. Examples of other suitable aminoplast formers are ureas, dicyandiamide, thiourea, guanidine (salts), ethanolamine and other amines.

Formaldehyde, usually in the form of a 30% or higher percentage aqueous formalin solution or as paraformaldehyde, is used as the aldehyde. However, within the scope of the invention it is also possible to replace up to 50 mole % of the formaldehyde by acetaldehyde or glyoxylic acid.

The common sulfites such as alkali and alkaline earth sulfites, as well as hydrogen sulfites or pyrosulfites thereof, are preferably used as the sulfites. Their effect is to make the condensation products according to the invention water-soluble or water-compatible.

A mixture of the sulfite and other reactants introducing anionic groups can also be used instead of the pure sulfite component. Aminosulfonic acids such as sulfanilic acid or taurine, amidosulfonic acid (sulfamic acid) and/or aminocarboxylic acids such as e.g. glycine that are reactive towards aldehydes are suitable for this. Up to 50 mole % of the sulfite can be replaced by these anionic reactants.

An essential feature of the invention is that the molar ratio of amino-s-triazine to formaldehyde to sulfite is set to 1:1.9 to 2.9:0.7 to 1.3 in order, on the one hand, to ensure the colloidal structure necessary for the inventive properties of the products and, on the other hand, to ensure the molecular growth that is necessary for the structure of incoherent colloids without jellification. The preferred molar ratio of amino-s-triazine to formaldehyde to sulfite is 1:2.0 to 2.3:0.9 to 1.1. If some of the amino-s-triazine, the formaldehyde or the sulfite is replaced by other reactants as mentioned above, then these are incorporated into the molar ratio in an equimolar manner.

The condensation is carried out in aqueous solution. The total concentration of the reaction mixture is preferably adjusted such that the final condensation product accumulates with a solids content of 5 to 25% by weight.

Although the order of addition of the reaction components in the first step is not important, it has nevertheless proven to be advantageous with regard to reaction management and control to first add the formaldehyde in aqueous solution and subsequently to successively feed the amino-s-triazine and the sulfite component into the reaction solution.

The pH value in the first step is adjusted to 9.0 to 12.0, preferably to 10.5 to 11.5. This can be achieved with common alkaline-reacting compounds or salts, especially hydroxides. For reasons of economy sodium hydroxide solution is preferably used to set the alkaline pH value. The setting of the pH value can also be carried out in several steps. The reaction temperature in the first step is set at 50° to 90° C., preferably 60° to 80° C. in order to maintain an economically favorable reaction period. The first step is completed when the sulfite can practically no longer be detected with conventional methods.

After completion of the first reaction step which has normally ended after 60 to 180 minutes, the pH value is adjusted to 2.0 to 5.0 in the second step and the condensation is continued at a temperature of 50° to 100° C.

The acidic pH value in the second step which is preferably at a pH of 3.0 to 4.5 is adjusted with common acids or acidic compounds or salts, inorganic mineral acids. In particular sulfuric acid is preferred for reasons of cost. If sulfonic acids or carboxylic acids are used instead of a part of the sulfite, these can be used in their acidic form to adjust the pH. The required amount of mineral acids decreases accordingly or can be completely omitted. The sulfonic acids or carboxylic acids can also be used in their salt form.

The condensation reaction is completed when the viscosity of a diluted aqueous solution alkalinized at pH values of 8.0 to 13.0 and having a solids content of 20% by weight has a value of 500 to 100,000 cp at 20° C. (Brookfield-Synchro Lectric viscometer). This viscosity is preferably 1000 to 50,000 cp.

Once the condensation product according to the invention has reached the desired final viscosity in the second step, the reaction solution is again alkalinized. This can be achieved with the same bases or basic compounds as in the first step i.e. in particular a hydroxide and preferably sodium hydroxide solution.

After the condensation is completed the reaction solution is cooled. The solution has a pH value of 8 to 13 and a preferred solids content of 5 to 25% by weight. The product can either be used directly in a liquid form or as a powder after spray drying. Spray drying together with other substances, e.g. with aqueous solutions of flow-improving agents, is also possible.

The condensation products according to the invention normally already have an inherent low free formaldehyde content of <0.01% by weight. However, at extreme molar ratios the free formaldehyde content may exceed this value. In this case it is possible within the scope of the invention to carry out an aftertreatment following step b) in a strong alkaline range at pH $\geq$ 11.0 and at a temperature between 50° and 100° C., preferably at 60° to 80° C. As a rule at least 0.5 mole hydroxide, e.g. in the form of sodium hydroxide, must be used per mole of liberatable formaldehyde that is still present after steps a) and b). Other common hydroxides can be used instead of NaOH such as e.g. calcium hydroxide. This strongly alkaline aftertreatment which is already described in EP 336 165 B1 is usually carried out until there is no longer any change in the free formaldehyde content or until a desired limit has been reached which is usually the case after 5 to 60 minutes.

The condensation products according to the invention are stable in storage for at least 6 months 2 years as a powder as well as a solution.

Due to their suspension-stabilizing properties, the highly viscous condensation products of the invention are excellently suitable as additives for hydraulically curing building material mixtures such as e.g. concrete, mortar, plaster and anhydrite etc. in which they can be combined particularly well with the usual flow-improving agents and particularly those based on conventional sulfonated melamine-formaldehyde resins (preferred mass ratio 5:1 to 1:5) and also with naphthalene resins or polymeric flow-improving agents based on acrylates and vinyl compounds. In this case they are preferably used in an amount of 0.01 to 10% by weight, preferably 0.1 to 5% by weight relative to the solids content of the respective inorganic binder suspension.

In addition the products according to the invention can be generally used to stabilize aqueous dispersions, emulsions and suspensions such as polymer and reactive resin dispersions, film-forming polymer-dispersions and dispersion paints, reactive resin emulsions and pigment suspensions.

The following examples are intended to further elucidate invention.

EXAMPLES

TABLE 1

Production examples 1 to 12

Molar ratios

| Example | Melamine | Urea | Acetoguanamine | Formaldehyde | Sodium pyrosulfite | Sulfanilic acid | Amidosulfonic acid |
|---|---|---|---|---|---|---|---|
| 1 | 1.0 | | | 2.9 | 1.0 | | |
| 2 | 1.0 | | | 2.3 | 1.0 | | |
| 3 | 0.8 | 0.2 | | 1.9 | 0.8 | | |
| 4 | 0.75 | | 0.25 | 1.8 | 0.75 | | |
| 5 | 1.0 | | | 1.9 | 1.0 | | |
| 6 | 1.0 | | | 2.9 | 0.7 | | |

TABLE 1-continued

Production examples 1 to 12

Molar ratios

| Example | Melamine | Urea | Acetoguanamine | Formaldehyde | Sodium pyrosulfite | Sulfanilic acid | Amidosulfonic acid |
|---|---|---|---|---|---|---|---|
| 7 | 1.0 | | | 2.9 | 1.3 | | |
| 8 | 1.0 | | | 2.2 | 0.8 | 0.2 | |
| 9 | 1.0 | | | 2.1 | 0.8 | | 0.2 |
| 10 | 0.8 | 0.2 | | 2.2 | 0.8 | 0.2 | 0.2 |
| 11 | 1.0 | | | 1.9 | 0.9 | | |
| 12 | 1.0 | | | 2.1 | 1 | | |

General instructions

Melamine, formaldehyde and water I are placed in a 2 liter three-necked flask with a stirrer, reflux cooler and dropping funnel and alkalinized with sodium hydroxide solution I.

In the case of a partial replacement of melamine by other aminoplast formers these are added together with the melamine. In the case of a partial replacement of formaldehyde by other aldehydes these are used together with the formaldehyde.

Subsequently the sulfite is fed in portions into the reaction solution which is then heated to 70° to 80° C. As soon as sulfite is no longer detectable, the solution is optionally first acidified by addition of sulfonic acids or carboxylic acids which is then followed by the addition of sulfuric acid. If no sulfonic or carboxylic acid is used then it is acidified only with sulfuric acid. Subsequently it is diluted with water II for the condensation.

Condensation is carried out at 80° C. until the viscosity of a solution previously alkalinized to pH values of 8 to 13 and diluted to a solids content of 20% by weight has reached the values stated in Table 2. Subsequently the entire mixture is alkalinized with sodium hydroxide solution II.

TABLE 2

| weighed amounts [%] | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Formaldehyde 30% | 163,0 | 129,2 | 134,8 | 124,7 | 106,8 | 163,0 | 163,0 | 120,8 | 118,1 | 110,0 | 106,8 | 114,6 |
| Water I | 155,3 | 155,3 | 150,7 | 115,1 | 155,3 | 150,7 | 150,7 | 150,7 | 155,5 | 122,7 | 155,3 | 150,8 |
| Sodium hydroxide solution I (20%) | 13,5 | 13,5 | 13,7 | 12,5 | 13,5 | 13,7 | 13,7 | 13,7 | 13,7 | 9,8 | 13,5 | 13,1 |
| Melamine | 70,8 | 70,8 | 70,8 | 65,9 | 70,8 | 70,8 | 70,8 | 70,8 | 70,8 | 50,4 | 70,8 | 68,7 |
| Urea | — | — | 8,4 | — | — | — | — | — | — | 6,0 | — | — |
| Acetoguanamine | — | — | — | 21,8 | — | — | — | — | — | — | — | — |
| Sodium pyrosulfite | 53,1 | 53,1 | 53,1 | 49,4 | 53,1 | 37,4 | 69,4 | 42,7 | 42,7 | 38,0 | 47,8 | 51,5 |
| Sulfanilic acid | — | — | — | — | — | — | — | 19,5 | — | 17,3 | — | — |
| Amidosulfonic acid | — | — | — | — | — | — | — | — | 10,9 | 9,7 | — | — |
| Sulfuric acid (25%) | 64,0 | 59,6 | 84,2 | 64,7 | 70,4 | 45,4 | 102,8 | 72,6 | 35,2 | 13,0 | 80,3 | 65,4 |
| Water II | 264,7 | 264,7 | 263,4 | 345,1 | 264,7 | 253,8 | 306,8 | 279,9 | 265,0 | 266,7 | 264,7 | 257,0 |
| Sodium hydroxide solution II (20%) | 56,0 | | 79,1 | 57,3 | 66,0 | 31,6 | 129,1 | 92,0 | 69,0 | 47,9 | 71,7 | 55,6 |
| Initial solids [%] | 24,4 | 24,2 | 24,8 | 24,2 | 24,0 | 23,3 | 24,8 | 24,7 | 24,1 | 24,8 | 23,5 | 24,1 |
| Final viscosity [cp] 20% sol. at 20° C. | 663 | 800 | 4700 | 2520 | 7300 | 22000 | 1100 | 60700 | 38300 | 550 | 1080 | 8600 |
| Solids content of final solution [%] | 21,8 | 21,9 | 22,5 | 22,8 | 20,7 | 21,4 | 22,3 | 22,2 | 21,9 | 21,9 | 21,7 | 21,6 |

Application examples

Application example 1

Sedimentation and demixing phenomena can be determined in hardening mortars by vertically cleaving or sawing suitable specimens along the central axis. The examination is carried out by visual inspection or by counting the coarse grain in upper and lower regions of identical size. A pourable mortar recipe according to Table 3a was prepared for this purpose.

TABLE 3a

Mortar mixture based on Portland cement PZ 55

| Basic recipe | Amounts weighed in [g] |
|---|---|
| Portland cement PZ 55 | 900 |
| Sand (0–4 mm) | 1350 |
| Denka CSA 20 | 31.5 |
| Flow-improving agent | 9.0 |

Melment L10 $^R$ from SKW Trostberg, which is a sulfonated melamine-formaldehyde resin, was used as the flow-improving agent. Denka CSA 20 is a commercial expansion additive based on calcium sulfoaluminate. The sand used as the aggregate was used in each case with an identical particle size distribution by separately weighing in the individual particle size fractions (cf. Table 4).

The mortars were mixed according to Table 3a and adjusted to the same consistency (flow, Hägermann funnel) by varying the W/C value.

TABLE 3b

| Control example using an antisettling agent | | | |
|---|---|---|---|
| Condensation product according to example 2 | — | 4.5 | [g] |
| W/C[1] | 0.35 | 0.42 | |
| Flow [cm] | 32.5 | 32.5 | |

[1])W/C = water - cement ratio

Figure 1A:
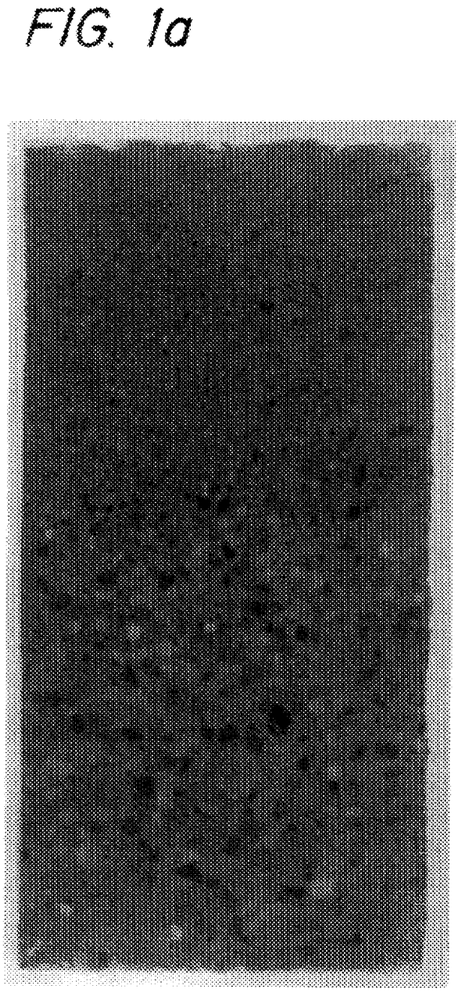
FIGS. 1a and 1b are microphotographs showing a control and an embodiment of the invention, respectively.
Figure 1B:
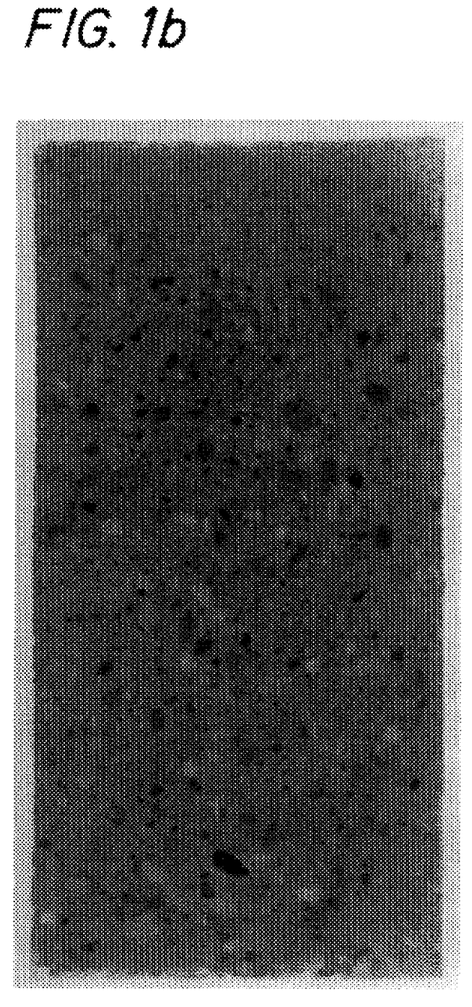

After hardening the cylindrical specimens were sawed vertically (FIGS. 1a and 1b).

The micrograph of a polished section shows that in the control experiment (FIG. 1a) a pronounced sedimentation, particularly of the coarse grain, has occurred.

Addition of the inventive condensation product according to production example 2 led to a considerably more homogeneous distribution of the aggregates with the same mortar consistency (FIG. 1b).

Application example 2a

The anti-sedimentation action was also tested in a self-levelling screed recipe based on an industrial scale FGD-anhydrite (flue-gas desulfurization anhydrite). The maximum particle size of this anhydrite was <100 µm (0.1 mm) of which 50% had a particle size of <21 µm and 90% of <54 µm. Potassium sulfate was used as an activator.

The sand used as an aggregate was sieved into the individual particle size fractions according to Table 4. Each fraction was individually weighed in order to exclude demixing errors.

TABLE 4

| Particle size distribution, sand 0-4 mm | | |
|---|---|---|
| mm | Amount [g] | Amount [%] |
| >4 | 135 | 10.00 |
| 4-2 | 378 | 28.00 |
| 2-1 | 297 | 22.00 |
| 1-0.5 | 243 | 18.00 |
| 0.5-0.25 | 202.5 | 15.00 |
| 0.25-0.125 | 94.5 | 7.00 |
| Total | 1350.0 | 100.00 |

The self-levelling screed has the composition shown in Table 5. The mixing was carried out according to the RILEM CEM mixing program (DIN 1164). All mixtures were adjusted to the same consistency by varying the amounts of mixing water. Potassium sulfate (1% by weight relative to the anhydrite) was used as the activator and Melment L10[R] from SKW Trostberg AG (1% by weight relative to the anhydrite) was used as the flow-improving agent.

The inventive condensation products of production examples 2 and 12 were added in a dose of 0.5% by weight relative to the anhydrite. The adjustment of the same consistency was achieved by varying the water/anhydrite values and by measuring flow parameters (Hägermann funnel).

TABLE 5a

| Self-levelling screed mixture based on FGD-anhydrite | |
|---|---|
| Basic recipe | All amounts weighed in [g] |
| FGD-anhydrite | 675 |
| Sand (0-4 mm) | 1350 |
| Potassium sulfate | 6.75 |
| Flow-improving agent | 6.75 |

TABLE 5b

| | Control example | Condensation product according to example | |
|---|---|---|---|
| | | 2 | 12 |
| Condensation product (according to the invention) [g] | — | 3.375 | 3.375 |
| Water [g] | 300 | 325 | 325 |
| Flow index | 30.0 | 29.9 | 30.5 |

After mixing the self-levelling screed mixture was filled into cylindrical high-grade steel moulds that can be dismantled longitudinally (height 15.2 cm; diameter 7.6 cm, volume 690 ml) and left in them for 20 hours until a plastic consistency had developed but not yet hardened. After reaching the plastic consistency it was possible to remove the casing. Stable cylindrical specimens were obtained which can be divided horizontally into two halves of the same size (upper and lower half) with the aid of a large laboratory spatula without much effort.

Immediately afterwards each half was separately quantitatively digested under flowing water over a set of sieves (pore size >4 to 0.125 mm, of Table 4). In this process the entire amount of anhydrite was washed out due to its small particle size so that only the sand used remained fractionated according to particle sizes. After drying to weight constancy the individual sieve contents were weighed, standardized per particle size fraction to 100% and in a comparison the upper half was related to the lower half (Table 6).

TABLE 6

| Comparison of sand fractions standardized to 100% per particle size fraction | | | |
|---|---|---|---|
| particle size in [mm] | control experiment | with the product according to example 2 | with the product according to example 12 |
| upper half of the specimen | | | |
| >4 | 26.5 | 41.8 | 40.9 |
| 4-2 | 39.1 | 47.9 | 47.9 |
| 2-1 | 46.3 | 50.0 | 53.8 |
| 1-0.5 | 52.2 | 52.4 | 52.8 |
| 0.5-0.25 | 49.7 | 48.1 | 51.3 |
| 0.25-0.125 | 55.9 | 47.2 | 51.8 |
| lower half of the specimen | | | |
| >4 | 73.5 | 58.2 | 59.1 |
| 4-2 | 60.9 | 52.1 | 52.1 |
| 2-1 | 53.7 | 50.0 | 46.2 |
| 1-0.5 | 47.8 | 47.6 | 47.2 |
| 0.5-0.25 | 50.3 | 51.9 | 48.7 |
| 0.25-0.125 | 44.1 | 52.8 | 48.2 |

Whereas in the control experiment 73.5% of the sand fraction with particle sizes >4 mm had settled in the lower half of the specimen and only 26.5% remained in the upper half, these values were 58.2% (bottom) to 41.8% (top) and 59.1% (bottom) to 40.9 (top) respectively for the two specimens formulated with the condensation products according to the invention of production examples 2 and 12.

An analogous distribution results when using sand of 2 to 4 mm particle size in which the two experiments with addition of products according to the invention were nearer to the ideal 50/50 distribution (top/bottom) than the control experiment.

The example shows that the condensation products according to the invention considerably reduce the sedimentation of the large aggregate particles (2 to 4 mm and >4 mm).

Application example 2b

In order to determine the sedimentative layering of the self-levelling screed including the proportion of fines (anhydrite), cylindrical specimens were again manufactured in an analogous manner to example 2a but were this time hardened.

Figure 2A:
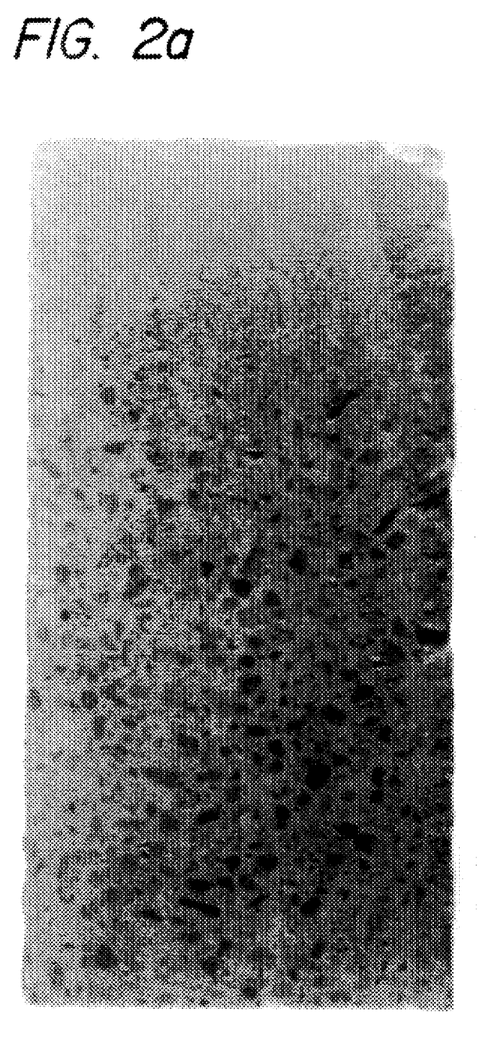
FIGS. 2a and 2b are also microphotographs respectively showing a control and an embodiment of the invention.
Figure 2B:
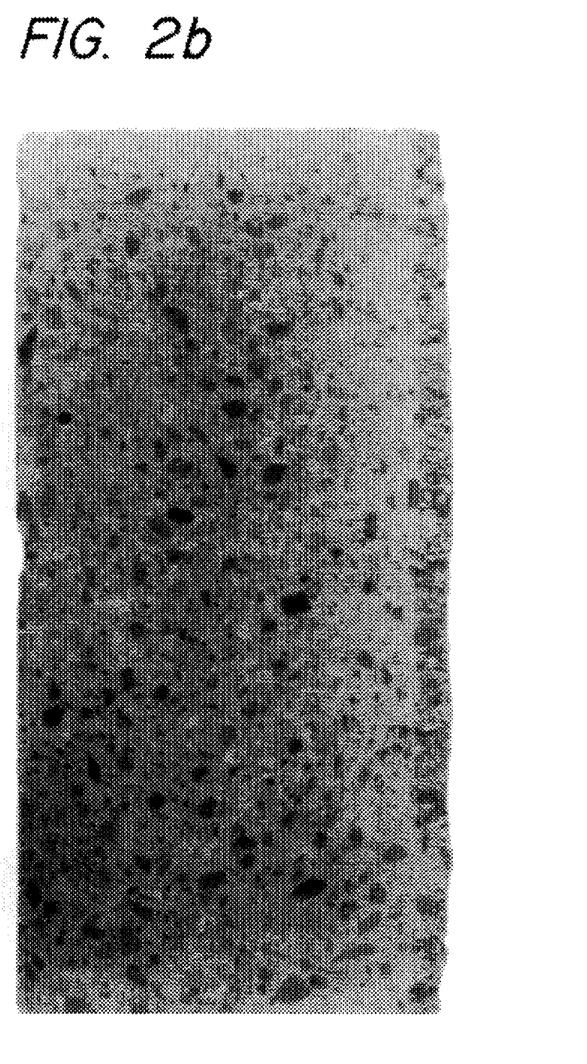

After complete hardening (10 days at 20° C., then a further 3 days at 40° C. until weight constancy) the specimens were sawed vertically (FIGS. 2a and 2b).

In agreement with the previous experiment the micrograph of a polished section showed that in the control example (FIG. 2a) a strong sedimentation of the aggregate had occurred. The larger grains of sand are readily recognizable in this case as particles. The strong sedimentation of the sand particles which are larger compared to the anhydrite inevitably leads to the formation of a layer of fines that is composed mainly of anhydrite which has clearly deposited on the upper side of the specimen.

The addition of the condensation products according to the invention (produced according to example 12) completely prevents the formation of such a layer of fines on the upper side (FIG. 2b). Instead the micrograph shows a good homogeneous distribution of binder and aggregate over the entire section of the test piece.

Floating layers of fines as shown in the control example (FIG. 2a) are denoted skin formation. They lead to major problems when laying anhydrite self-levelling screed since, on the one hand, they significantly delay the drying process through their imperviousness and hardness (higher proportion of binder) so that it is not possible to further cover or coat the screed with for example tiles, reaction resins or carpets.

On the other hand they are susceptible to brittleness and thus to stress cracks due to lack of leaning material (i.e. lack of sand, aggregate component). As a result such layers of fines must in practice frequently be expensively removed by grinding.

Application experiment 2c

The test that the resins according to the invention develop their anti-sedimentation action without thickening the binder suspension was carried out by determining the time-dependent flow. The formulation according to Table 5 (control example and self-levelling screed with addition of production example 12) was used. The flow was determined according to the conventional practical method using a H ägermann funnel in which the diameter of the mortar which had spread on a glass plate after lifting the funnel is measured. The mixture used for the time-dependent measurement was stirred again for one minute before each measurement and kept covered between measurements. The results are summarized in Table 7.

TABLE 7 time-dependent flowability, flow in [cm]

| | immediately | after 30 min | after 1 h | after 2 h | after 3 h |
|---|---|---|---|---|---|
| Control example | 30.1 | 30.7 | 30.5 | 30.6 | 30.4 |
| using the product according to example 12 | 29.6 | 29.6 | 29.1 | 28.8 | 28.5 |

Whereas in the control example some water separation (bleeding) occurred at the edges of the mortar cake, the self-levelling screed mixture admixed with the condensation product according to the invention exhibited a creamy and coherent flow without demixing phenomena over the entire time period.

Application example 2d

In order to demonstrate that the products according to the invention considerably improve the time course of drying of self-levelling anhydrite screeds, the drying characteristics of specimens were monitored over a time period of 4 weeks.

Encased specimens with dimensions of 22.5×15.0×4.7 cm (length/width/height) were used in which water liberation was only possible through the non-encased surface.

The test mortar used for this has the following composition (Table 8):

TABLE 8a

| all amounts weighed in [g] | |
|---|---|
| FGD-anhydrite | 1350 |
| sand (0–4 mm) | 2700 |
| potassium sulfate | 13.5 |
| Melment L10$^R$ | 13.5 |

The consistency of the control experiment and the experiment with the inventive product according to production example 12 was adjusted to the same values by varying the water/anhydrite value (Table 8b).

TABLE 8b

| Control experiment; all amounts weighed in [g] | | |
|---|---|---|
| condensation product according to example 12 | — | 6.75 |
| water | 500 | 581 |
| flow index [cm] | 28.0 | 28.4 |

The specimens were stored under constant conditions (20° C., 65% relative air humidity) and the loss in water resulting from drying was determined by weighing daily over a time period of 27 days.

After 4 weeks they were dried at 40° C. until constancy of weight. The cumulated percentage loss in water was calculated on the basis of this value and compared in Table 9 as the residual water content relative to the total content of non-bound water.

TABLE 9

Time course of drying of self-levelling anhydrite screed residual water content in |%|

| after ... day(s) | control example | using the anti-settling agent according to production example 12 |
|---|---|---|
| 0 | 100.00 | 100.00 |
| 1 | 68.3 | 77.4 |
| 2 | 61.0 | 64.6 |
| 3 | 59.1 | 59.9 |
| 6 | 52.2 | 45.9 |
| 7 | 50.4 | 42.4 |
| 8 | 48.1 | 39.1 |
| 9 | 47.5 | 36.6 |
| 10 | 46.5 | 34.2 |
| 13 | 41.7 | 27.0 |
| 14 | 40.7 | 25.1 |
| 15 | 40.5 | 23.9 |
| 16 | 40.0 | 22.4 |
| 17 | 37.9 | 20.2 |
| 20 | 36.3 | 17.1 |
| 21 | 35.6 | 16.1 |
| 22 | 35.i | 15.1 |
| 23 | 33.3 | 13.4 |
| 24 | 32.6 | 12.5 |
| 27 | 30.6 | 10.1 |

The example shows that self-levelling anhydrite screed admixed with the inventive product according to production example 12 exhibits considerably improved drying characteristics. Increased water liberation already takes place after 6 days. After 27 days the remaining residual water content of 10.1% is significantly lower than the 30.6% in the control experiment.

Application example 3

The example describes the effectiveness of the products according to the invention in preventing the segregation of mixing water at mortar surfaces (bleeding).

The test for cement paste was carried out according to the guidelines for the granting of licences for concrete additives, version of June 1993, paragraph 7.5.1.4: Effectiveness of stabilizers (ST).

For this 0.9 l of the cement paste mixture with a water/cement value (W/C) of 0.6 was filled into a 1 liter measuring cylinder. The segregation of water was recorded after 0.5, 2 and 5 hours. The dosage of the products according to the invention of production examples 3 and 4 was 0.5% by weight with respect to the cement in each case. Cement used: HOZ 35 L HS NW Na Montafirm

TABLE 10

| | water segregation in [ml] after | | |
|---|---|---|---|
| | 0.5 h | 2 h | 5 h |
| control experiment | 20 | 60 | 60 |
| using the product according to example 3 | 3 | 25 | 30 |
| using the product according to example 4 | 3 | 28 | 33 |

The example shows the reduction of the bleeding water by the products according to the invention in the effectivity test for cement-bound mortars and concretes.

Application example 4

The stabilizing properties of the condensation products according to the invention were tested in an analogous manner in an FGD-anhydrite-sand mixture (composition see Table 11a). Melment L10$^R$ was used as the flow improving agent and a condensation product according to production example 9 was used as the stabilizing additive.

TABLE 11a

Mortar mixture based on FGD-anhydrite

| basic recipe | all amounts weighed in [g] |
|---|---|
| FGD-anhydrite | 675 |
| sand (0–4 mm) | 1350 |
| potassium sulfate | 6.75 |
| flow-improving agent | 3.375 |

TABLE 11b

| | control experiment | example 4a | example 4b |
|---|---|---|---|
| stabilizing additive according to example 9 [g] | — | 1.69 | 1.69 |
| mixing water [g] | 325 | 325 | 367 |
| water/binder value | 0.4815 | 0.4815 | 0.5437 |
| flow index in [cm] (Hägermann funnel) | 27.3 | 21.3 | 27.1 |

Whereas example 4a has the same water/binder value as the control experiment, in example 4b more water was added to adjust to the same consistency.

900 cm$^3$ of the mortar material was filled into a 1 l standing cylinder and the bled water which segregated was measured after 30 minutes as well as after 1, 2 and 5 hours (Table 12).

TABLE 12

| | Segregation of water in [ml] after | | | |
|---|---|---|---|---|
| | 0.5 h | 1 h | 2 h | 5 h |
| Control experiment | 20 | 30 | 35 | 35 |
| Example 4a | 0 | 3 | 7 | 13 |
| Example 4b | 3 | 5 | 7 | 22 |

The example shows the stabilizing action of the products according to the invention in FGD-anhydrite mixtures.

Application example 5

The hardening of mineral building materials is usually determined by measuring the surface hardness or the compressive strength of specimens (e.g. 10×10 cm cubes). Example 5 demonstrates that the condensation products according to the invention do not adversely affect the hardening process of cement-based or anhydrite-based binders.

The determination of the compressive strength and the Shore D hardness was carried out on anhydrite mixtures according to Table 11, example 4a (same W/C as in the control experiment). The product produced according to example 2 was used. The values are listed in Table 13.

TABLE 13

|  | Density in [kg/dm³] | Compressive strength in [N/mm²] after 3 days | 7 days | Shore D hardness after 1 day | 3 days | 7 days |
| --- | --- | --- | --- | --- | --- | --- |
| Control experiment | 2.160 | 18.2 | 19.0 | 51 | 73 | 76 |
| with product accord. to ex. 2 | 2.174 | 19.7 | 20.2 | 47 | 74 | 78 |

The example shows that the products according to the invention do not introduce any air whatsoever into the mixture. The bulk density is not reduced. Moreover the products do not have any properties which retard setting.

The neutral properties of the condensation products according to the invention with regard to setting also in cement-based systems was demonstrated by measuring the heat of hydration of Portland cement PZ 35 F at a W/C of 0.35.

TABLE 14

Generation of hydration heat of Portland cement 35 F

|  | Dosage | maximum temperature in [°C.] | reached after ... hours |
| --- | --- | --- | --- |
| Control experiment | — | 78 | 11.5 |
| with product according to ex. 2 | 0.5% by weight relative to cement | 84 | 11.0 |

A delay in setting would be exhibited by a lower temperature maximum and a later occurrence of this maximum.

Application examples 6 and 7
Water retention

The retention (water retention) of mixing water in mortar or concrete mixtures is a problem which frequently occurs in the building industry. Particularly when mortar is applied in thin layers as occurs when using so-called smoothing compositions or tile adhesives based on cement, there is a risk that the mortar will dry out ("die of thirst") as a result of the large surfaces.

In order to determine the water retention capacity, a mortar mixture is prepared according to DIN 1164. The amount of mixing water is selected such that a spreading index of 18±1 cm is obtained on the spreading table. Liquid additives are admixed with the mixing water and solid additives are admixed with the binder.

Immediately after determination of the spreading index the mortar prepared in this manner is filled into a nutsch filter in which a moistened filter paper (Schleicher & Schüll No. 1574, medium speed, Ø17 cm) had previously been placed and which had been weighed and the mortar is scraped off flush with a straight edge. The filled upper part of the nutsch filter is now weighed again and then connected to a suction flask. It is sucked for exactly 2 minutes at a pressure of 250 mbar. Subsequently the weight of the nutsch filter containing the aspirated mortar is determined again. The water remaining in the mortar (water retention capacity) is given in %

Calculation $$W = \frac{\left[\frac{G_1 - G_0}{M} \cdot w\right] - |G_1 - G_2|}{\frac{G_1 - G_0}{M} \cdot w} \times 100$$

W=water retention capacity in %
$G_0$=weight of the empty nutsch+ moistened filter
$G_1$=weight of nutsch before suction
$G_2$=weight of nutsch after suction
M=weight of the total mortar mixture
w=weight of mixing water Application example 6

The mortar formulation is given in Table 15, the test values of the water retention test are listed in Table 16.

TABLE 15

| Mortar formulation, W/C = 0.5, Amount weighed in [g] | |
| --- | --- |
| Portland cement PZ 35 | 450 |
| Standard sand | 1350 |
| Mixing water | 225 |

TABLE 16

Water retention

|  | Dosage | W |
| --- | --- | --- |
| Control experiment | — | 57.2 |
| Product according to example 7 | 2% by weight | 64.8 |
| Product according to example 7 | 3% by weight | 82.6 |
| Product according to example 7 | 4% by weight | 93.7 |

In addition to the suction method it is possible to also test the water retention capacity in mortars or cement pastes which are used for wall plasters, adhesives for aerated concrete or sealers on strongly absorptive subsurfaces. It is intended to demonstrate this by bonding cubes of aerated concrete using cement paste.

Application example 7

4% by weight (solid) of the additive is added to 100 g Portland cement PZ 35 F. Then sufficient water is added until a water content of 36% by weight is reached. The water of the test solution if it is added as a liquid must also be taken into consideration. Subsequently the cement paste is stirred vigorously for 30 to 60 seconds. The cement paste obtained in this manner is used to prepare three bonds in each case with the air-dried, dust-free cubes of aerated concrete.

Part of the cement paste is applied to the front surface of a cube of aerated concrete and a second cube of aerated concrete is pressed onto the cement paste. After 24 hours the bond is examined by breaking it apart by hand. The evaluation is based on the fracture picture whereby only the bonding actions of 4 to 6 are suitable in practice.

| bonding action 6 | fracture in the aerated concrete or not able to break apart |
| --- | --- |
| bonding action 5–6 | fracture partly in the aerated concrete, partly in the joint |

-continued

| | |
|---|---|
| bonding action 5 | fracture in the joint, very difficult to break |
| bonding action 4 | fracture in the joint, difficult to break |
| bonding action 3 | fracture in the joint, easy to break |
| bonding action 2 | almost no adhesion |
| bonding action 1 | no adhesion |

TABLE 17

Aerated concrete bonding

| | |
|---|---|
| Control experiment | bonding action 2 |
| Cement paste using the product according to production example 5 | bonding action 4 |
| Cement paste using the product according to production example 2 | bonding action 5–6 |

Cement pastes with a good water retention do not release any water into the absorptive aerated concrete and thus have a high bonding activity. If the water is absorbed from the cement paste into the adherent surface then the cement can no longer completely set and no bonding occurs (control experiment).

Examples 6 and 7 show the water retention properties of the condensation products according to the invention.

Application example 8
Cohesive strength

When concreting under water washing out or disintegrating the concrete must not occur since otherwise the required compressive strengths cannot be achieved.

Pouring into the formwork is frequently carried out in free fall and can be simulated by a drop test in water. For this 100 parts by weight of a homogeneous dry mixture of 450 parts by weight Portland cement of strength class Z 45 F corresponding to the German standard DIN 1164 and 1350 g standard sand together with the amount of water that is necessary to obtain a compact sphere with a good cohesive strength from the mortar, are stirred intimately for 1 minute in a porcelain casserole, subsequently left for 10 minutes and then again stirred vigorously for 1 minute.

A sphere is moulded from the mortar obtained in this manner, its weight is determined and it is allowed to fall through the water to the bottom of a 1 l measuring cylinder which is filled with tap water up to the 1 l mark and measures 33 cm in height and 6 cm in diameter. Then the vessel is turned on its head, the sphere is allowed to drop back to the opening of the measuring cylinder which is closed by a hand and it is removed. The weight loss compared to the sphere before the drop experiment in the water is determined by weighing the sphere.

A mortar with good cohesion exhibits a minimal loss of weight by washing out, in addition the water in the measuring cylinder remains mainly clear while the sphere falls. The additive according to the invention is examined according to the described method. For this, mortar is prepared in which 1.7 parts by weight of the additive in powder form according to production examples 8 and 9 were dissolved in the mixing water. The results of the drop experiment are listed in Table 18.

TABLE 18

Cohesive strength of mortar mixtures under water

| | Loss of weight of the mortar sphere \|relative to the initial weight\| | State of the mortar sphere | State of the water |
|---|---|---|---|
| control experiment | 8.6% by weight | partially disintegrated | strongly turbid |
| using product according to example 8 | 4.5% by weight | compact | turbid |
| using product according to example 9 | 3.7% by weight | compact | slightly turbid |

The examples substantiate the good cohesive strength of mortars for underwater concrete as they can be produced with the aid of condensates according to the invention.

It will be understood that the specification and examples are illustrative but not limitative of the present invention, and that other embodiments within the spirit and scope of the invention will suggest themselves to those skilled in the art.

We claim:

1. A highly viscous condensation product containing sulfonic acid groups based on amino-s-triazines with at least 2 amino groups and formaldehyde, the product having a viscosity of 500 to 100,000 cp at 20° C. and a pH value of 8.0 to 13.0 as an aqueous solution with a solids content of 20% by weight.

2. The product of claim 1 produced by the process comprising:
   (a) condensing amino-s-triazine, formaldehyde and sulfite in a molar ratio of 1:1.9 to 2.9:0.7 to 1.3 in aqueous solution at a pH value of 9.0 to 12.0 and a temperature of 50 to 90° C. until the sulfite is no longer detectable; and
   (b) subsequent further condensing at a pH value of 2.0 to 5.0 and a temperature of 50° to 100° C. until the viscosity exhibits the desired value.

3. The condensation product of claim 1 wherein melamine is the amino-s-triazine.

4. The condensation product of claim 1 wherein the molar ratio of amino-s-triazine to formaldehyde to sulfite is 1:2.0 to 2.3:0.9 to 1.1.

5. The condensation product of claim 1 wherein up to 50 mole % of the formaldehyde is substituted by acetaldehyde and/or glyoxylic acid.

6. The condensation product of claim 1 wherein up to 50 mole % of the sulfite is substituted by a reactive aminosulfonic acid, amidosulfonic acid and/or aminocarboxylic acid.

7. A process for the production of a highly viscous condensation product containing sulfonic acid groups based on amino-s-triazine with at least 2 amino groups and formaldehyde, comprising:
   (a) condensing amino-s-triazine, formaldehyde and sulfite in a molar ratio of 1:1.9 to 2.9:0.7 to 1.3 in aqueous solution at a pH value of 9.0 to 12.0 and a temperature of 50° to 90° C. until the sulfite is no longer detectable; and
   (b) subsequently condensing at a pH value of 2.0 to 5.0 and a temperature of 50° to 100° C. until the viscosity of an aqueous solution alkalinized at a pH value of 8.0 to 13.0 and having a solids content of 20% by weight has a value of 500 to 100,000 cp at 20° C.

8. The process of claim 7 wherein melamine is used as the amino-s-triazine.

9. The process of claim 7 wherein a molar ratio of amino-s-triazine to formaldehyde to sulfite of 1:2.0 to 2.3:0.9 to 1.1 is used.

10. The process of claim 7 wherein the total concentration of the reaction components in the aqueous solution is adjusted so that the condensation product accumulates with a solids content of 5 to 25% by weight.

11. The process of claim 7 wherein the pH value in the first condensation step is adjusted to 10.5 to 11.5.

12. The process of claim 7 wherein the first condensation step is carried out at a temperature of 60° to 80° C.

13. The process of claim 7 wherein the pH value in the second condensation is adjusted to 3.0 to 4.5.

14. The process of claim 7 wherein after step b) the condensation product is subjected to an aftertreatment in a strongly alkaline range at pH $\geq 11.0$ and at a temperature of 50° to 100° C. in order to reduce the free formaldehyde content.

15. The process of claim 7 wherein after step b) the condensation is continued until the viscosity of the aqueous solution alkalinized to a pH value of 8.0 to 13.0 and having a solids content of 20% by weight is 1,000 to 50,000 cp at 20° C.

16. A method of stabilizing an aqueous suspension, comprising: adding a condensation product of claim 1 to the suspension in an amount of 0.01 to 10% by weight relative to the solids content of the respective aqueous suspension.

17. The method of claim 16 wherein the suspension is an inorganic binder suspension.

18. The method of claim 16 wherein the condensation product is used in an amount of 0.1 to 5% by weight relative to the solids content of the aqueous suspension.

19. The method of claim 16 further comprising adding flow-improving agents, based in particular on sulfonated melamine-formaldehyde resins to the suspension.

20. The method of claim 19 wherein the condensation product is used in a weight ratio of 5:1 to 1:5 relative to the sulfonated melamine-formaldehyde resin.

21. The process of claim 14 wherein the temperature is 60 to 80° C.

22. A highly viscous condensation product in the form of an incoherent reversible colloid containing sulfonic acid groups based on amino-s-triazines with at least 2 amino groups and formaldehyde, the product having a solids content of 5 to 25 wt.-%, a viscosity of 500 to 100,000 cp at 20° C. and a pH value of 8.0 to 13.0 as an aqueous solution with a solid content of 20% by weight, produced by the process comprising:

(a) condensing amino-s-triazine, formaldehyde, and sulfite in a molar ratio of 1:1.9 to 2.9:0.7 to 1.3 in aqueous solution at a pH value of 9.0 to 12.0 and a temperature of 50 to 90° C. until the sulfite is no longer detectable; and (b) subsequent further condensing at a pH value of 2.0 to 5.0 and a temperature of 50 to 100° C. until the viscosity exhibits the desired value.

* * * * *

UNITED STATES PATENT AND TRADEMARK OFFICE
CERTIFICATE OF CORRECTION

PATENT NO. : 5,789,526
DATED : August 4, 1998
INVENTOR(S) : Josef Weichmann, et al.

It is certified that error appears in the above-identified patent and that said Letters Patent is hereby corrected as shown below:

In column 9, line 47, change "with for example tiles" to
- - with, for example, tiles - -.
In column 9, line 61-62, change "H ägermann" to - - Hägermann - -.

In column 13, line 57-58, change "Sch üll" to - - Schüll - -.
In column 15, line 50-51, change "1 1" to - - 1 1 - -.

In column 17, claim 14, line 16 change " $\geq$ " to -- $\geqq$ --.
In cover page, in the section entitled U.S. Patent Documents, change "4, 501, 939" to - - 4, 501, 839 - -.

UNITED STATES PATENT AND TRADEMARK OFFICE
CERTIFICATE OF CORRECTION

PATENT NO. : 5,789,526
DATED : August 4, 1998
INVENTOR(S) : Josef Weichmann, et al.

It is certified that error appears in the above-identified patent and that said Letters Patent is hereby corrected as shown below:

In column 11, Table 9, 2nd column, change "35.i" to -- 35.1 --.

In column 4, line 33, change "pH ≧ 11.0 " to -- pH ≥ 11.0 --.
In column 4, line 45, change "months" to -- months to --.
In column 7, line 14, change "hardening" to -- hardening, --.
In column 8, Table 5a, 2nd column, 4th entry, delete space in "6. 75" to -- 6.75 --.
In column 8, line 24, insert comma after the word "mixing" to -- mixing, --.
In column 8, line 36, change "of" to -- cf --.

Signed and Sealed this

Thirty-first Day of October, 2000

Attest:

Attesting Officer

Q. TODD DICKINSON
Director of Patents and Trademarks